United States Patent
Liggett et al.

(10) Patent No.: US 8,812,533 B1
(45) Date of Patent: *Aug. 19, 2014

(54) SYSTEM, METHOD AND COMPUTER PROGRAM PRODUCT FOR AUTOMATICALLY PRESENTING SELECTABLE OPTIONS IN A LOOKUP FIELD

(75) Inventors: Emily Alane Liggett, San Mateo, CA (US); Mustafa Murat Paksoy, Toronto (CA); Paul Burstein, San Francisco, CA (US); Susan Marie Kimberlin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/470,270

(22) Filed: May 21, 2009

(51) Int. Cl.
*G06F 17/30* (2006.01)

(52) U.S. Cl.
USPC .............................. 707/768; 707/748; 707/722

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,805,159 A * | 9/1998 | Bertram et al. | 715/764 |
| 5,819,038 A | 10/1998 | Carleton et al. | |
| 5,821,937 A | 10/1998 | Tonelli et al. | |
| 5,826,257 A * | 10/1998 | Snelling, Jr. | 1/1 |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,378,042 B1 * | 4/2002 | Henderson et al. | 711/128 |
| 6,393,605 B1 | 5/2002 | Loomans | |
| 6,405,220 B1 | 6/2002 | Brodersen et al. | |

(Continued)

OTHER PUBLICATIONS

Harrell, Frank E. Jr. and Aaron Mackey, Details about System Specifications, [online] Jan. 12, 2002 [retrieved on Apr. 25, 2011], retrieved from the Internet URL: http://biostat.mc.vanderbilt.edu/wiki/pub/Main/ResDM/designDetails.pdf.*

(Continued)

*Primary Examiner* — Ajay Bhatia
*Assistant Examiner* — Miranda Huang
(74) *Attorney, Agent, or Firm* — Zilka-Kotab, PC

(57) ABSTRACT

In accordance with embodiments, there are provided mechanisms and methods for automatically presenting selectable options in a lookup field. These mechanisms and methods for automatically presenting selectable options in a lookup field can enable more efficient identification of data via a lookup.

13 Claims, 7 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,043,700 B1 * | 5/2006 | Bertram et al. ............... 715/811 |
| 7,062,502 B1 | 6/2006 | Kesler |
| 7,181,758 B1 | 2/2007 | Chan |
| 7,209,929 B2 | 4/2007 | Dominguez, Jr. et al. .... 707/103 |
| 7,216,292 B1 * | 5/2007 | Snapper et al. ............... 715/236 |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,407,599 B1 * | 3/2013 | Klein et al. ................... 715/739 |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0035673 A1 * | 3/2002 | Roseborough et al. ........ 711/129 |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins ....................... 709/203 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. ................. 707/4 |
| 2005/0091098 A1 | 4/2005 | Brodersen et al. |
| 2005/0108344 A1 * | 5/2005 | Tafoya et al. ................. 709/206 |
| 2005/0223022 A1 | 10/2005 | Weissman et al. ............ 707/102 |
| 2005/0283478 A1 | 12/2005 | Choi et al. ........................ 707/9 |
| 2006/0206834 A1 | 9/2006 | Fisher et al. ................... 715/777 |
| 2007/0118844 A1 * | 5/2007 | Huang et al. ................... 719/330 |
| 2007/0130137 A1 * | 6/2007 | Oliver et al. ....................... 707/5 |
| 2008/0010243 A1 | 1/2008 | Weissman et al. ................. 707/2 |
| 2008/0214150 A1 * | 9/2008 | Ramer et al. ................ 455/414.1 |
| 2008/0249972 A1 | 10/2008 | Dillon |
| 2009/0063415 A1 | 3/2009 | Chatfield et al. |
| 2009/0158143 A1 * | 6/2009 | Arav ............................. 715/261 |

OTHER PUBLICATIONS

U.S. Appl. No. 12/465,486, filed May 13, 2009.
U.S. Appl. No. 60/828,192, filed Oct. 4, 2006.

\* cited by examiner

SYSTEM, METHOD AND COMPUTER PROGRAM PRODUCT FOR AUTOMATICALLY PRESENTING SELECTABLE OPTIONS IN A LOOKUP FIELD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to look-ups, and more particularly to performing look-ups.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, lookups have been performed for identifying stored data. For example, lookups are generally utilized for searching tables, databases, etc. for particular data. Unfortunately, traditional techniques employed for identifying stored data with respect to lookups have exhibited various limitations.

Just by way of example, lookups have traditionally been performed by submitting a call to a data structure (e.g. database, table, etc.) storing the data which is the subject of the lookup. Thus, techniques have not been implemented with respect to lookups in which data may be automatically identified from a predetermined set of data, prior to performing the lookup. To this end, identifying data via lookups has generally required the lookup to be performed in every situation, oftentimes resulting in delay in identifying the data, an efficient usage of system resources, etc.

BRIEF SUMMARY

In accordance with embodiments, there are provided mechanisms and methods for automatically presenting selectable options in a lookup field. These mechanisms and methods for automatically presenting selectable options in a lookup field can enable more efficient identification of data via the lookup. For example, data may be identified without necessarily performing the lookup.

In an embodiment and by way of example, a method is provided for automatically presenting selectable options in a lookup field. In use, input is received in a lookup field utilized for performing lookups. Furthermore, a list of options is automatically presented for selection thereof, based on the input, such that performance of the lookup is prevented upon selection of at least one of the options.

While the present invention is described with reference to an embodiment in which techniques for automatically presenting selectable options in a lookup field are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for automatically presenting selectable options in a lookup field.

To date, identifying data via lookups has required a call to a data structure to be made. Unfortunately, using calls to data structures each time data is desired to be identified via a lookup has been inefficient. For example, requiring the lookup to be performed in every situation has oftentimes unnecessarily resulted in delay in identifying the data, an efficient usage of system resources, etc.

Thus, mechanisms and methods are provided for automatically presenting selectable options in a lookup field. These mechanisms and methods for automatically presenting selectable options in a lookup field can enable more efficient identification of data via a lookup.

Next, mechanisms and methods for automatically presenting selectable options in a lookup field will be described with reference to exemplary embodiments.

Figure 1:
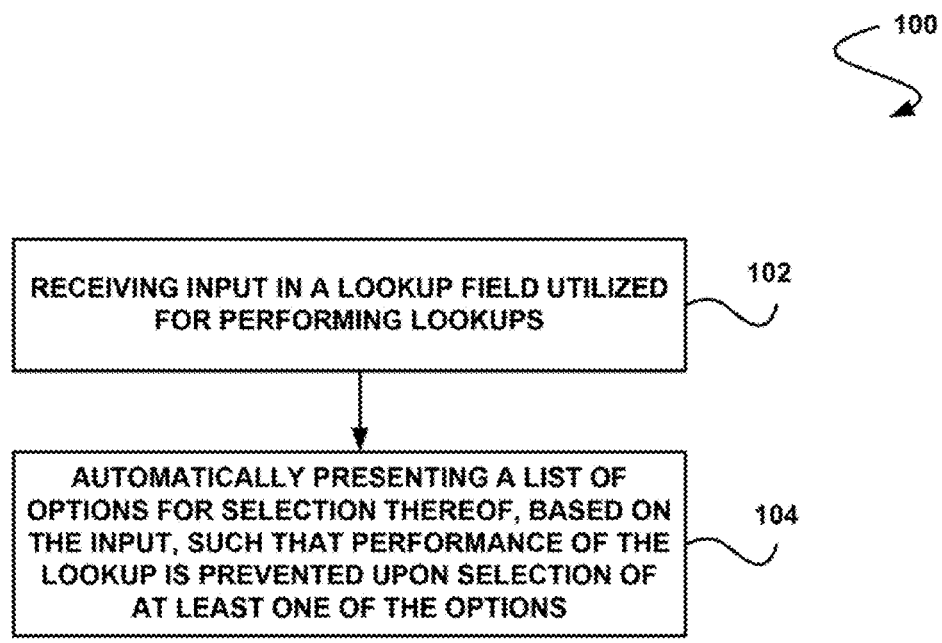
FIG. 1 shows a method for automatically presenting selectable options in a lookup field, in accordance with one embodiment.

FIG. 1 shows a method 100 for automatically presenting selectable options in a lookup field, in accordance with one embodiment. As shown, input is received in a lookup field utilized for performing lookups. See operation 102. With respect to the present description, the lookup field may include any field capable of performing lookups based on input received therein.

For example, the lookup field may include any field of a record (e.g. a database record) on which a lookup may be performed. For example, the lookup may be performed on the field for populating the field with data (e.g. another record) identified via the lookup. In one embodiment, the lookup field may be utilized for performing lookups on data stored in a database. Of course, the lookup field may be utilized for performing lookups on data stored in any other type of data structure (e.g. a table, etc.).

As another option, the database and/or other type of data structure may be provided by a multi-tenant on-demand database service. In the present description, such multi-tenant on-demand database service may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

Additionally, the input received via the lookup may include any type of input capable of being received via the lookup field. In one embodiment, the input may include a single character. In another embodiment, the input may include a string (e.g. string of characters) or optionally a plurality of strings which form a phrase. To this end, the lookup criterion may optionally include text.

In one embodiment, the input may include input to be used to perform the lookup. Just by way of example, the input may include input which is to be looked up (via performance of the lookup). In this way, the input may include information (e.g. associated with an object, a record, etc.) that the user desires to lookup.

It should be noted that the input may be received in the lookup in any desired manner. For example, in one embodiment, the input may be received in the lookup field from a user utilizing a user interface. Thus, the user may enter the input in the lookup field of the user interface. As an option, the user interface may be provided by the multi-tenant on-demand database service, such that the input may be received by the multi-tenant on-demand database service.

Further, a list of options is automatically presented for selection thereof, based on the input, such that performance of the lookup is prevented upon selection of at least one of the options. See operation 104. With respect to the present description, the list of options may include any selectable options that are associated with the input. For example, the list of options may include items (e.g. records) with which the lookup field may be populated.

In one embodiment, the list of options may be generated (prior to the performance of the lookup) for automatic presentation thereof based on the input. For example, the list of options may include items that at least partially match the input. As another example, if the items include records, the list of options may include records with content (e.g. in a field thereof, etc.) that at least partially matches the input. Thus, if the record includes content with a same sequence of characters as the input, the record may be included in the list of options. In another embodiment, the list of options may be generated for automatic presentation thereof in response to receipt of the input.

In another embodiment, the list of options may be generated for automatic presentation thereof based on a predetermined set of options. The predetermined set of options may include items previously viewed within a predetermined period of time, items previously edited within a predetermined period of time, items previously looked up within a predetermined period of time, items previously searched within a predetermined period of time, and/or any other items which may be predetermined.

Optionally, the predetermined set of options may be limited to including items of a single object. For example, the single object may include a plurality of items, one including the lookup field via which the input is received. Thus, the predetermined set of options may be specific to the single object, such that each object may have a different set of predetermined options. As another option, the predetermined set of options may be limited to a predetermined number (e.g. 25, 50, etc.) of options (e.g. options most closely matching the input).

As an option, the predetermined set of options (or a reference thereto) may be stored in a cache (e.g. upon viewing, editing, etc. of such options) for retrieval and use thereof in generating the list of options. The cache may be provided by the multi-tenant on-demand database service, such that the list of options may be automatically presented using the multi-tenant on-demand database service. Accordingly, the list of options may be generated in a manner that is independent of the performance of the lookup.

As noted above, the list of options may be automatically presented (e.g. displayed) for selection thereof. For example, the list of options may be displayed in a drop down list of the user interface via which the input is received. Of course, however, the list of options may be displayed in any desired manner. As an option, the list of options may be sorted alphabetically with respect to the characters existing after the characters that matching the input. Further, a predetermined number of options may be displayed, with a scroll bar appearing for use in scrolling the list of options if the list of options includes more than the predetermined number of options.

The automatic presentation may include presenting the list of options upon receipt of a predetermined number of characters in the lookup field (e.g. 1, 2, etc.), after a predetermined amount of time, etc. In this way, the list of options may be refined based on additional input received in the lookup field (e.g. may be refined to only include items matching the input and the additional input, as entered in the lookup field, etc.). Further, the refined list of options may be automatically presented in response to the receipt of the additional input.

To this end, at least one of the options may be selected (e.g. by a user, etc.) based on the presentation thereof. The selection may be made using arrow keys to navigate through the list to an option and by selecting a tab or enter key, using a mouse, by entering in the lookup field input completely matching one of the options in the list, etc. With respect to the present description, selection of at least one of the options prevents the performance of the lookup (where the lookup would otherwise use the input received via the lookup field to identify data with which the lookup field is to be populated).

For example, the lookup field may be automatically populated with the selected option. In one embodiment where the lookup field includes a field of a record, the field of the record may be automatically populated with the selected option by storing the selected option in the field of the record. In another embodiment where the selected option includes a record, the lookup field may be automatically populated with the record by automatically creating an association (e.g. a join, a reference, etc.) between the record and another record that includes the lookup field via which the input is received. To this end, an auto-complete feature may be provided for the lookup field by automatically presenting a list of options for selection thereof by a user, such that selection of one of such options may prevent a need for the lookup to be performed.

Figure 2:
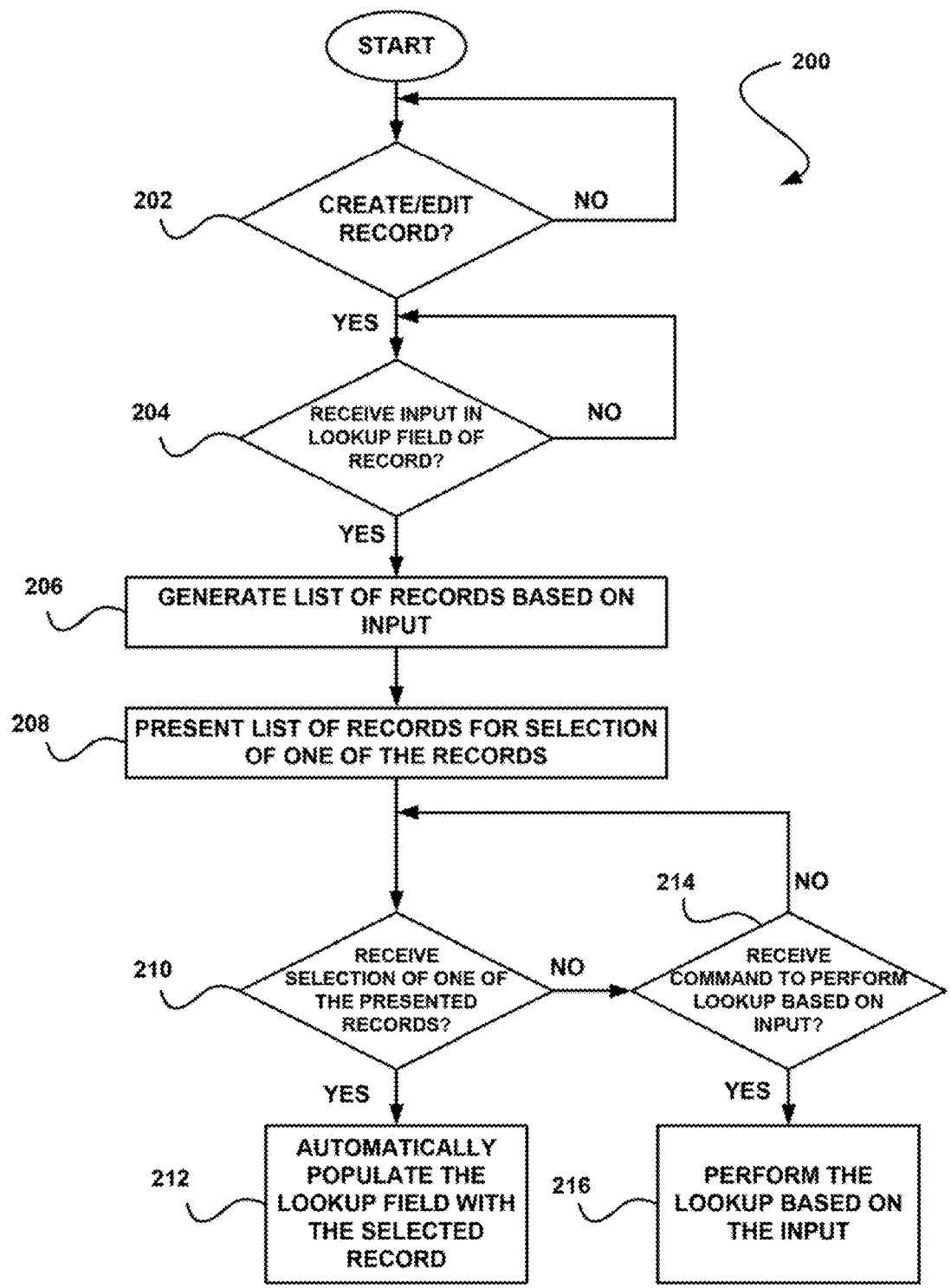
FIG. 2 shows a method for automatically populating a lookup field without performing a lookup, in accordance with another embodiment.

FIG. 2 shows a method 200 for automatically populating a lookup field without performing a lookup, in accordance with another embodiment. As an option, the present method 200 may be carried out in the context of the functionality of FIG. 1. For example, the present method 200 may be carried out by the multi-tenant on-demand database service described above with respect to FIG. 1. Of course, however, the method 200 may be carried out in any desired environment. The aforementioned definitions may apply during the present description.

As shown, it is determined whether a record is being created or edited. See decision 202. For example, it may be determined whether an option to create a record or edit an existing record has been received. As another example, it may be determined whether an interface for creating or editing a record is being presented to a user.

If it is determined that a record is not being created or edited, the method 200 continues to wait for creation or editing of a record to be initiated. If, however, it is determined that a record is being created or edited, it is further determined whether input has been received in a lookup field of the record. See decision 204. In one embodiment, determining whether input has been received in the lookup field may include determining whether an option to perform a lookup on a field of the record has been selected, and whether input has been entered into such record for use thereof in performing the lookup. For example, the input may include a character, a string, a phrase, etc.

If it is determined that the input has not been received, the method 200 continues to wait for input to be received. If, however, it is determined that input has been received, a list of records is generated based on the input. See operation 206. In one embodiment, the list of records may be generated by identifying records that match the input, at least in part. For example, records with fields at least partially matching the input may be identified and stored in the list of records for generating the list of records. The records determined to match the input may be selected from a predetermined set of records (e.g. stored in cache, etc.), such as records previously viewed and/or edited within a predetermined amount of time, etc.

Further, as shown in operation 208, the list of records is presented for selection of one of the records. In one embodiment, the list of records may be presented in a drop down list. Of course, however, the list of records may be presented in any manner that allows selection (by a user) of one of the records.

In decision 210 it is determined whether selection of one of the presented records is received. For example, the selection may be made by clicking on a presented record using a mouse. As another example, the selection may be made by entering in the lookup field input exactly matching the presented record. It should be noted that while selection of only one of the presented records is described herein, the selection may be of any number of the presented records.

If it is determined that selection of one of the presented records has been received, the lookup field is automatically populated with the selected record. See operation 212. In this way, the lookup field may be populated without necessarily requiring a lookup to be performed based on the input entered into the lookup field. For example, the selected record may be stored in the lookup field by storing a reference to the selected record. In this way, an association (e.g. a join) between the record which is being created/edited and the selected record may be established via the lookup field.

If it is determined that selection of one of the presented records has not been received, it is further determined whether a command to perform a lookup has been received. See decision 214. The command to perform the lookup may be received in response to a user selection of an option (e.g. user interface button) to perform the lookup.

If it is determined that a command to perform a lookup has not been received, the method 200 again determines whether selection of one of the presented records has been received (decision 210). If, however, it is determined that a command to perform a lookup has been received, the lookup is performed based on the input. See operation 216. It should be noted that the lookup may include any operation that determines whether the input is included in data on which the lookup is performed, with respect to the present description. For example, the lookup may be used to find the input in the data.

In one embodiment, the lookup may be performed by comparing the input to a single field of each of a plurality of records. For example, performing the lookup may include comparing the input to a name field of each record stored in a database, table, etc. As another example, performing the lookup may include comparing the input to a plurality of fields of each record stored in a database, table, etc. In this way, performing the lookup may include determining whether a record includes a field (e.g. name field) matching the input.

Optionally, the lookup may be performed using a search infrastructure. One example of performing a lookup using a search infrastructure is described in co-pending U.S. patent application Ser. No. 12/465,486, entitled "System, Method and Computer Program Product for Performing a Lookup Utilizing a Search Infrastructure," filed May 13, 2009.

Figure 3A:
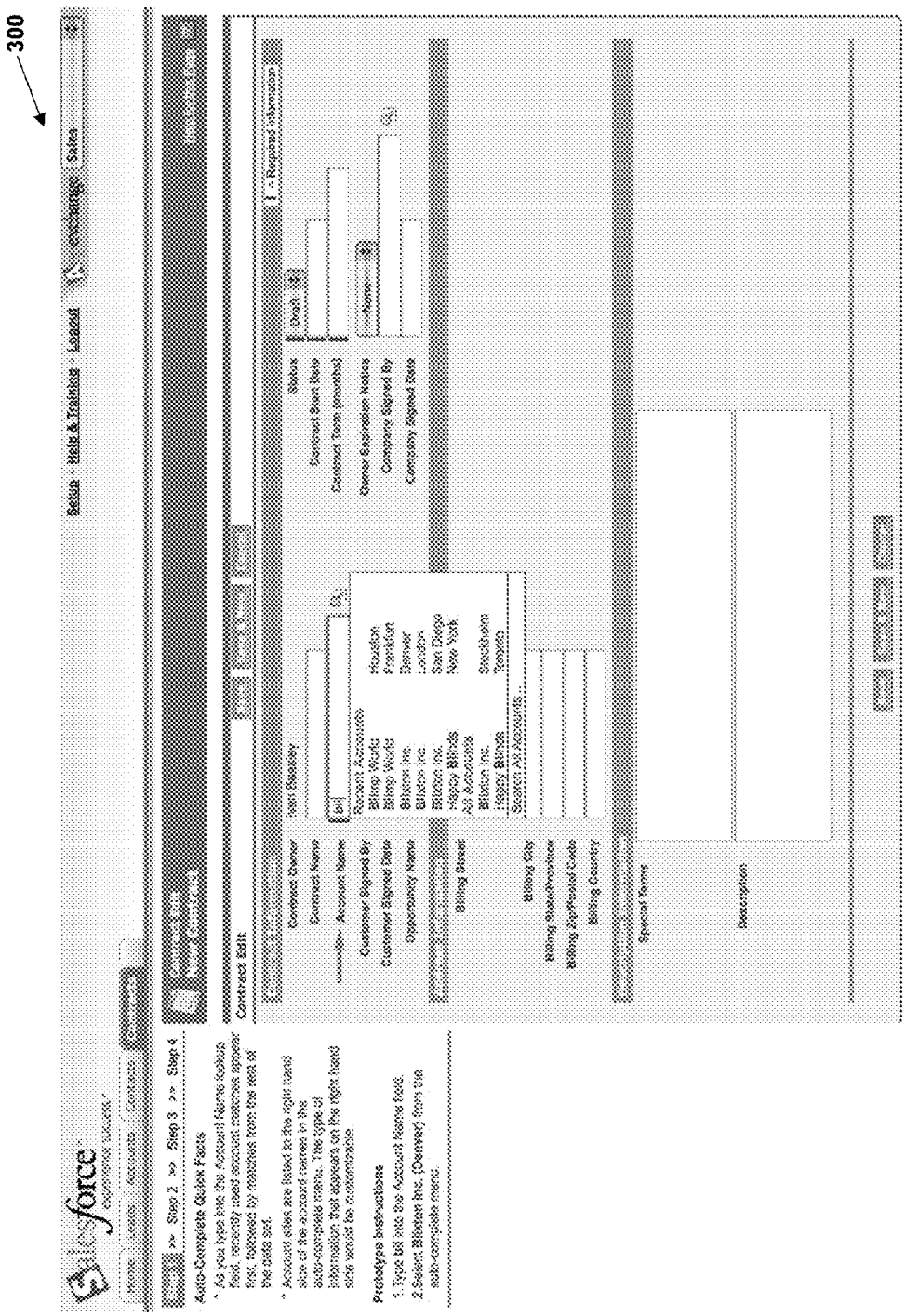
FIGS. 3A-C show user interfaces for automatically populating a lookup field without performing a lookup, in accordance with yet another embodiment.
Figure 3B:
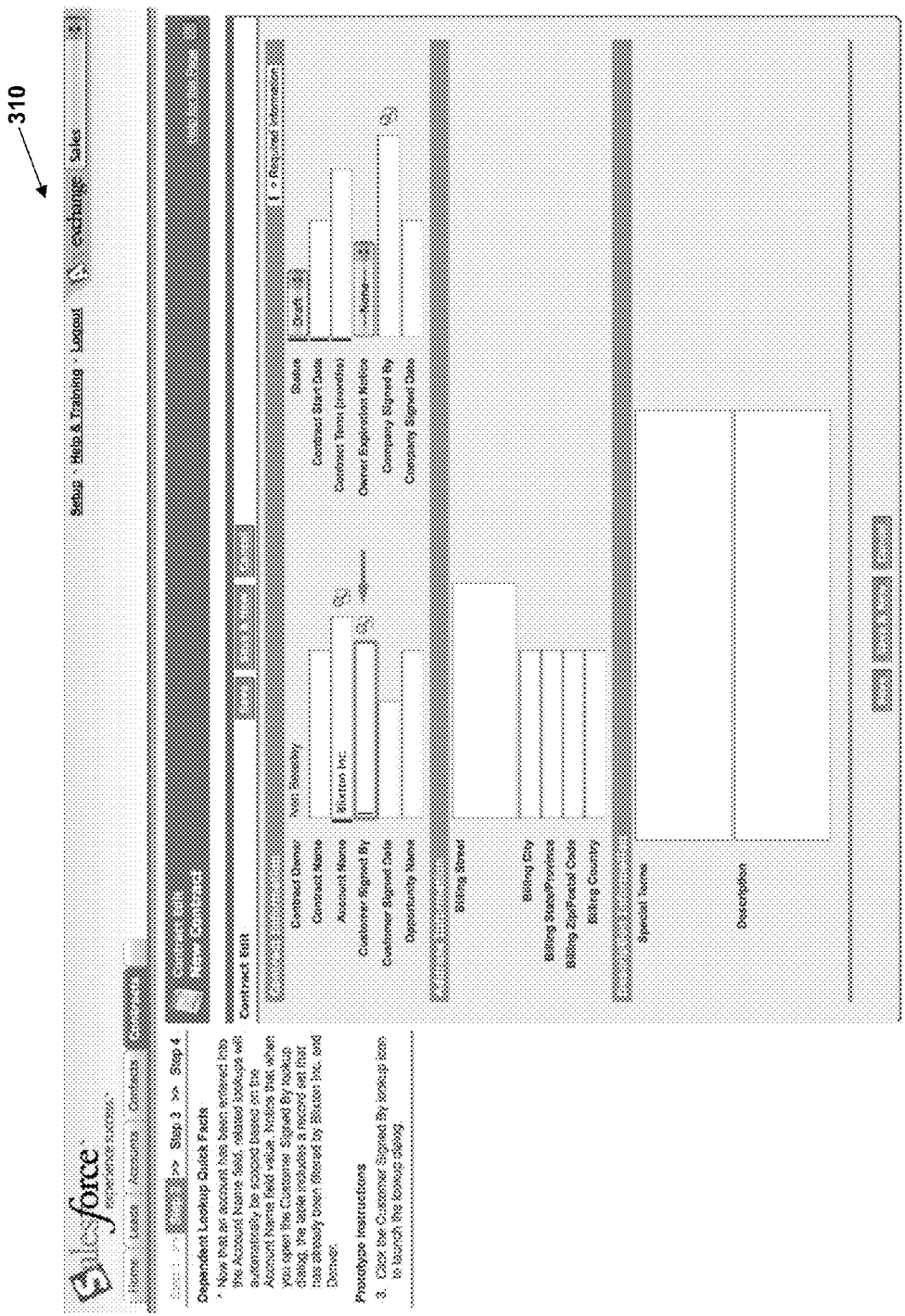
Figure 3C:
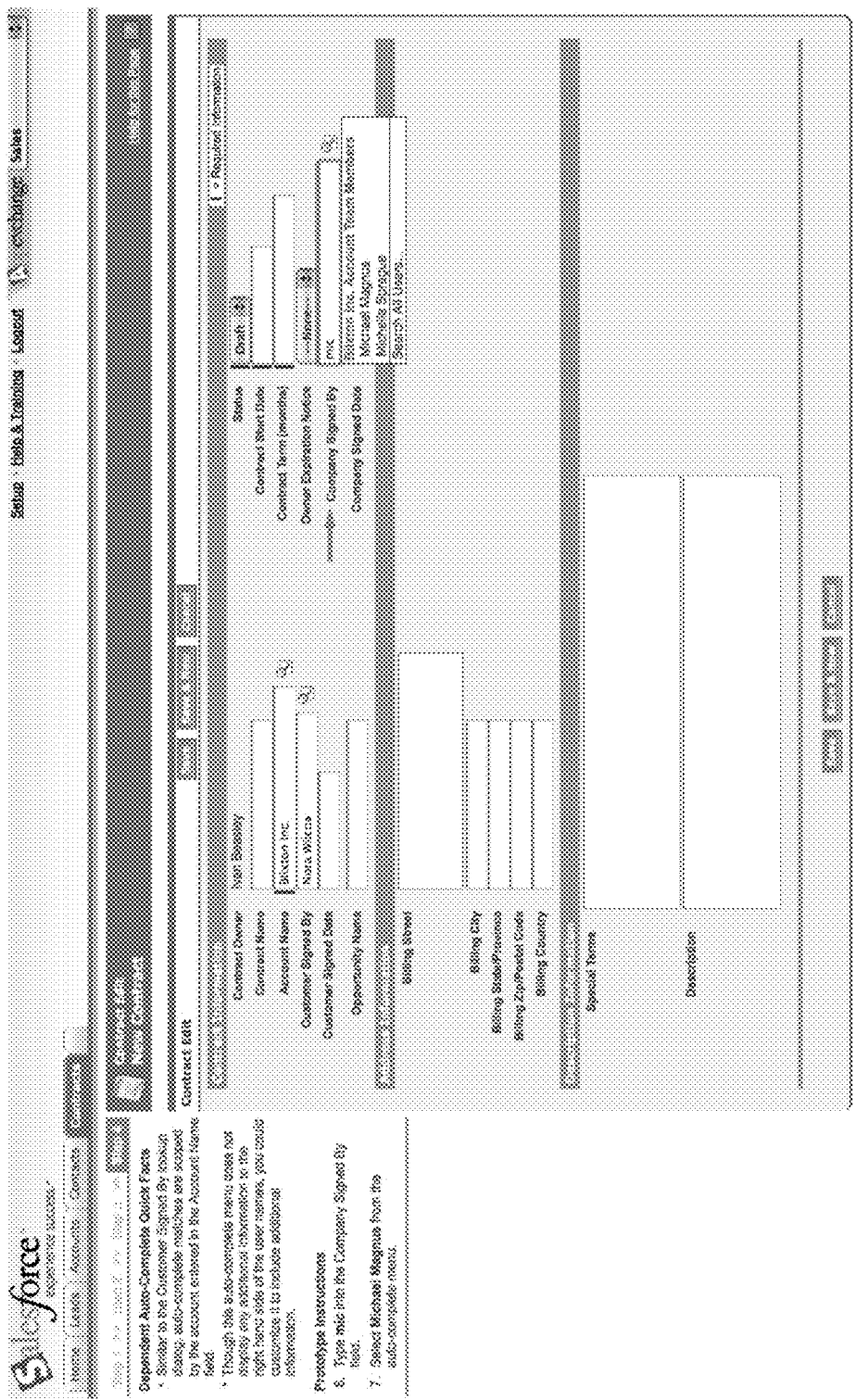

FIGS. 3A-C show user interfaces 300-320 for automatically populating a lookup field without performing a lookup, in accordance with yet another embodiment. As an option, the user interfaces 300-320 may be implemented in the context of the functionality of FIGS. 1-2. For example, the user interfaces 300-320 may be implemented by the multi-tenant on-demand database service described above with respect to FIG. 1. Of course, however, the user interfaces 300-320 may be implemented in any desired environment. Again, the aforementioned definitions may apply during the present description.

As shown, the user interface 300 of FIG. 3A for a record allows a user to enter input into an Account Name lookup field. Upon receipt of such input into the Account Name lookup field, accounts matching the input which have been viewed, edited, etc. within a predetermined period of time are automatically presented in a drop down list (without performing the lookup), following by matches from a remaining portion of a data set. The drop down list lists the matches by including the account names and the associated account locations for each listed account. In this way, the user may select one of the listed accounts.

Upon selection of one of the listed accounts, the selected account (e.g. name of the selected account) is stored in the lookup field, as shown in FIG. 3B. Further, related lookups may be automatically identified based on the field value of the lookup field. For example, if the Customer Signed By lookup dialog is opened, the table storing the record includes a record set that has already been filtered by the selected account.

Further, as shown in FIG. 3C, matches for input received in another lookup field (Company Signed By field, as shown)

are automatically presented (without performing the lookup) upon receipt of the input in such other lookup field. The matches may include records which have been viewed, edited, etc. within a predetermined period of time. Additionally, the matches may be filtered according to the account entered in the Account Name field.

System Overview

Figure 4:
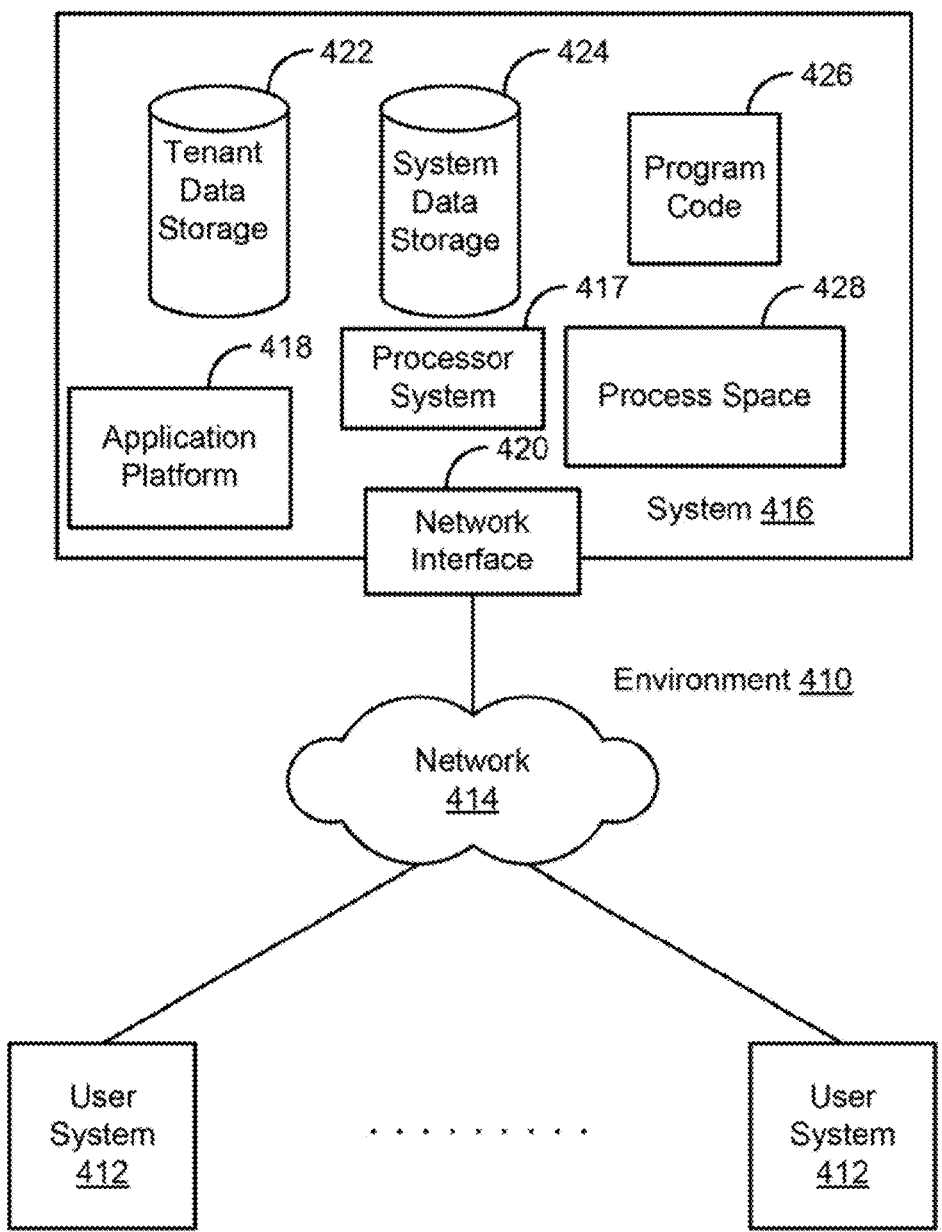
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
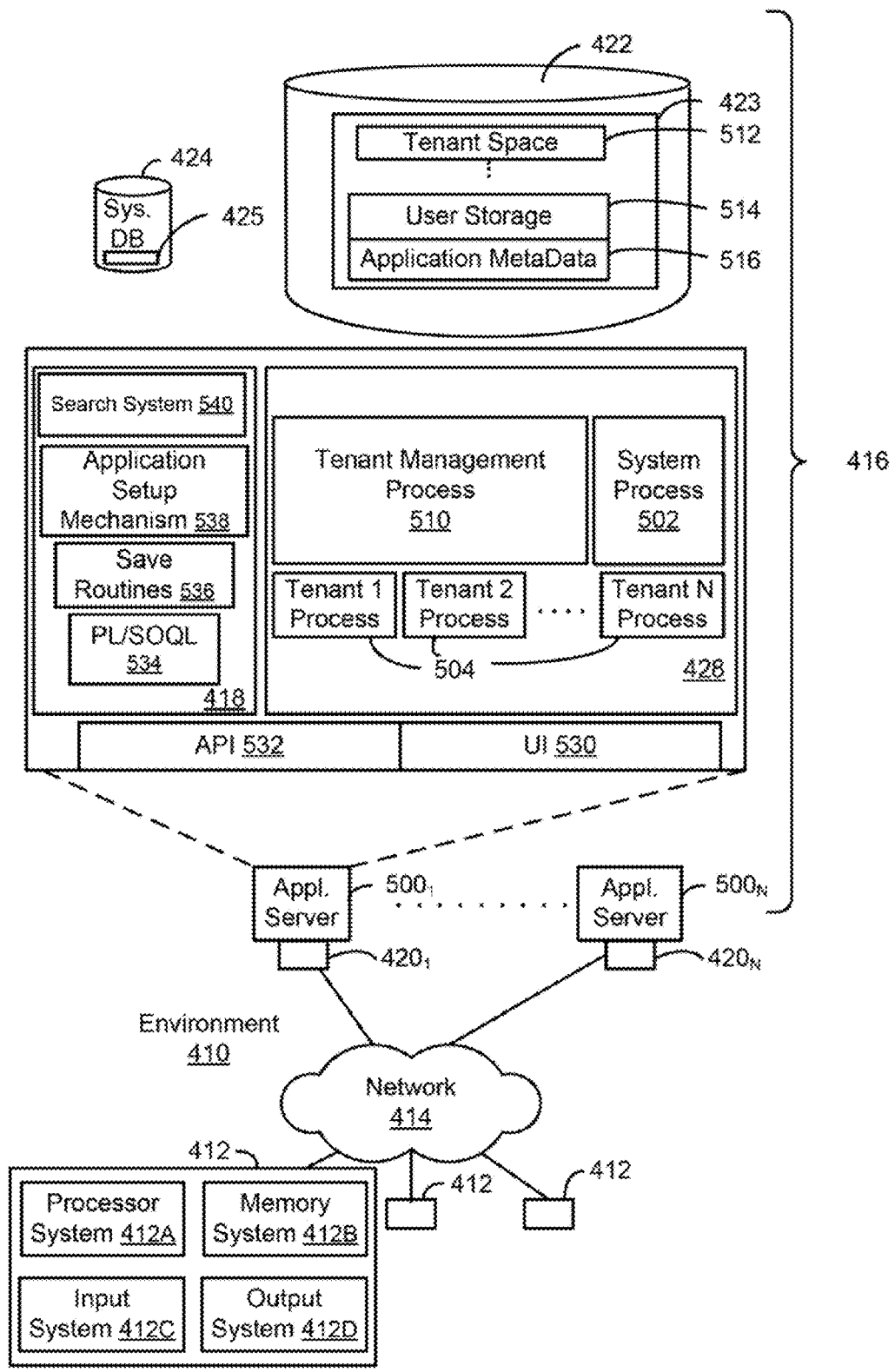
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, search system 540, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes a search system 540 for providing a search infrastructure via which searches for records (e.g. in the tenant data storage 422) may be performed. Further, the search infrastructure provided by the search system 540 may also be utilized for performing a lookup, such that lookup search results and features may be provided by the search system 540. Application platform 418 also includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$, might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus; a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   determining a first plurality of records that have been previously viewed within a system within a predetermined period of time;
   storing the determined first plurality of records in a cache;
   receiving an entry made by a user into a lookup field of a record to be created or edited;
   identifying one or more of the first plurality of records stored in the cache that are determined to include data that at least partially matches the entry made by the user into the lookup field;
   automatically presenting to the user the data of the one or more identified records that at least partially matches the entry, where the data is retrieved from the cache and is presented in a list;
   determining whether data of one of the one or more identified records presented in the list is selected by the user;
   when it is determined that data of one of the one or more identified records is selected by the user, automatically populating the lookup field of the record to be created or edited with the selected data, including automatically creating an association between the record to be created or edited and the record that contains the data selected by the user, such that a reference to the selected data is stored in the lookup field;
   when it is determined that data of one of the one or more identified records is not selected by the user, determining whether a command to perform a lookup has been received from the user in association with the entry made by the user into the lookup field; and
   when it is determined that the command to perform the lookup has been received from the user, performing the lookup by:
      comparing the entry made by the user into the lookup field to one or more fields of each of a second plurality of records stored in a database to determine whether the entry matches one or more fields of one or more records in the database, where the database is separate from the cache, and
      displaying results of the comparing to the user.

2. The method of claim 1, wherein the entry includes a string.

3. The method of claim 1, wherein the database is provided by a multi-tenant on-demand database service.

4. The method of claim 1, wherein the determined first plurality of records are stored in a single object.

5. The method of claim 4, wherein the single object includes the lookup field.

6. The method of claim 1, further comprising refining the data presented in the list based on additional input received from the user in the lookup field.

7. The method of claim 6, further comprising automatically presenting the refined data presented in the list in response to the receipt of the additional input from the user.

8. The method of claim 1, wherein the association includes a join.

9. A non-transitory machine-readable medium storing one or more sequences of instructions which, when executed by one or more processors, cause the one or more processors to carry out the steps of:
   determining a first plurality of records that have been previously viewed within a system within a predetermined period of time;
   storing the determined first plurality of records in a cache;
   receiving an entry made by a user into a lookup field of a record to be created or edited;
   identifying one or more of the first plurality of records stored in the cache that are determined to include data that at least partially matches the entry made by the user into the lookup field;
   automatically presenting to the user the data of the one or more identified records that at least partially matches the entry, where the data is retrieved from the cache and is presented in a list;

determining whether data of one of the one or more identified records presented in the list is selected by the user;

when it is determined that data of one of the one or more identified records is selected by the user, automatically populating the lookup field of the record to be created or edited with the selected data, including automatically creating an association between the record to be created or edited and the record that contains the data selected by the user, such that a reference to the selected data is stored in the lookup field;

when it is determined that data of one of the one or more identified records is not selected by the user, determining whether a command to perform a lookup has been received from the user in association with the entry made by the user into the lookup field; and when it is determined that the command to perform the lookup has been received from the user, performing the lookup by:
comparing the entry made by the user into the lookup field to one or more fields of each of a second plurality of records stored in a database to determine whether the entry matches one or more fields of one or more records in the database, where the database is separate from the cache, and displaying results of the comparing to the user.

10. An apparatus, comprising:

a processor; and one or more stored sequences of instructions which, when executed by the processor, cause the processor to carry out the steps of:

determining a first plurality of records that have been previously viewed within a system within a predetermined period of time;

storing the determined first plurality of records in a cache;

receiving an entry made by a user into a lookup field of a record to be created or edited;

identifying one or more of the first plurality of records stored in the cache that are determined to include data that at least partially matches the entry made by the user into the lookup field;

automatically presenting to the user the data of the one or more identified records that at least partially matches the entry, where the data is retrieved from the cache and is presented in a list;

determining whether data of one of the one or more identified records presented in the list is selected by the user;

when it is determined that data of one of the one or more identified records is selected by the user, automatically populating the lookup field of the record to be created or edited with the selected data, including automatically creating an association between the record to be created or edited and the record that contains the data selected by the user, such that a reference to the selected data is stored in the lookup field;

when it is determined that data of one of the one or more identified records is not selected by the user, determining whether a command to perform a lookup has been received from the user in association with the entry made by the user into the lookup field; and when it is determined that the command to perform the lookup has been received from the user, performing the lookup by:
comparing the entry made by the user into the lookup field to one or more fields of each of a second plurality of records stored in a database to determine whether the entry matches one or more fields of one or more records in the database, where the database is separate from the cache, and
displaying results of the comparing to the user.

11. A method for transmitting code for use in a multi-tenant database system on a transmission medium, the method comprising:

transmitting code for determining a first plurality of records that have been previously viewed within a system within a predetermined period of time;

transmitting code for storing the determined first plurality of records in a cache;

transmitting code for receiving an entry made by a user into a lookup field of a record to be created or edited;

transmitting code for identifying one or more of the first plurality of records stored in the cache that are determined to include data that at least partially matches the entry made by the user into the lookup field;

transmitting code for automatically presenting to the user the data of the one or more identified records that at least partially matches the entry, where the data is retrieved from the cache and is presented in a list;

transmitting code for determining whether data of one of the one or more identified records presented in the list is selected by the user;

transmitting code for automatically populating the lookup field of the record to be created or edited with the selected data when it is determined that data of one of the one or more identified records is selected by the user, including automatically creating an association between the record to be created or edited and the record that contains the data selected by the user, such that a reference to the selected data is stored in the lookup field;

transmitting code for determining whether a command to perform a lookup has been received from the user in association with the entry made by the user into the lookup field when it is determined that data of one of the one or more identified records is not selected by the user; and transmitting code for performing the lookup when it is determined that the command to perform the lookup has been received from the user by:
comparing the entry made by the user into the lookup field to one or more fields of each of a second plurality of records stored in a database to determine whether the entry matches one or more fields of one or more records in the database, where the database is separate from the cache, and
displaying results of the comparing to the user.

12. The method of claim 1, wherein additional data is automatically presented to the user with the data that at least partially matches the entry, the additional data including information associated with the data that at least partially matches the entry.

13. The method of claim 12, wherein the additional data includes location information associated with the data that at least partially matches the entry.

* * * * *